(12) United States Patent
Franzoni et al.

(10) Patent No.: US 12,196,228 B2
(45) Date of Patent: Jan. 14, 2025

(54) ELECTRO-HYDRAULIC POWER UNIT WITH VARIABLE OUTPUT FLOW

(71) Applicant: Parker-Hannifin Corporation, Cleveland, OH (US)

(72) Inventors: Germano Franzoni, Arlington Heights, IL (US); Barun Acharya, Schaumburg, IL (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 18/554,647

(22) PCT Filed: Apr. 18, 2022

(86) PCT No.: PCT/US2022/025175
§ 371 (c)(1),
(2) Date: Oct. 10, 2023

(87) PCT Pub. No.: WO2023/277994
PCT Pub. Date: Jan. 5, 2023

(65) Prior Publication Data
US 2024/0209873 A1  Jun. 27, 2024

Related U.S. Application Data

(60) Provisional application No. 63/248,795, filed on Sep. 27, 2021, provisional application No. 63/226,209,
(Continued)

(51) Int. Cl.
*F15B 11/16* (2006.01)
*F04B 1/295* (2020.01)
(Continued)

(52) U.S. Cl.
CPC ............ *F15B 11/165* (2013.01); *F04B 1/295* (2013.01); *F04B 17/03* (2013.01); *F15B 13/06* (2013.01);
(Continued)

(58) Field of Classification Search
CPC ................. F15B 11/165; F15B 13/06; F15B 2211/20515; F04B 17/03
See application file for complete search history.

(56) References Cited

U.S. PATENT DOCUMENTS 7,089,733 B1 * 8/2006 Jackson .................. F15B 21/08
60/452
10,472,805 B1 * 11/2019 Kumeuchi ............ E02F 9/2095
(Continued)

FOREIGN PATENT DOCUMENTS

CA  2936997 C  1/2017
CN  1391146 A  1/2003
(Continued)

OTHER PUBLICATIONS

International Search Report and Written Opinion prepared by the European Patent Office in international application No. PCT/US2022/025175 dated Aug. 16, 2022.

*Primary Examiner* — Abiy Teka
(74) *Attorney, Agent, or Firm* — McDonnell Boehnen Hulbert & Berghoff LLP

(57) ABSTRACT

An example system includes an electric motor (102); a pump (104) coupled to the electric motor; a hydraulic circuit (108) fluidly-coupled to the pump and configured to receive fluid flow from the pump; a hydraulic line (110) fluidly-coupled to the hydraulic circuit, wherein the hydraulic circuit is configured to provide a fluid signal to the hydraulic line, wherein the fluid signal is indicative of a fluid flow demand of the hydraulic circuit; a pressure sensor (112) mounted to the hydraulic line and configured to provide sensor infor-
(Continued)

mation indicative of pressure level of fluid in the hydraulic line; and a controller (114) configured to control a speed of the electric motor to vary fluid flow rate provided by the pump to the hydraulic circuit to meet the fluid flow demand based on the pressure level indicated by the sensor information.

16 Claims, 7 Drawing Sheets

Related U.S. Application Data filed on Jul. 28, 2021, provisional application No. 63/216,620, filed on Jun. 30, 2021.

(51) Int. Cl.
*F04B 17/03* (2006.01)
*F15B 13/06* (2006.01)

(52) U.S. Cl.
CPC ............... *F15B 2211/20515* (2013.01); *F15B 2211/6654* (2013.01)

(56) References Cited

U.S. PATENT DOCUMENTS

| | | |
|---|---|---|
| 10,473,097 B2 | 11/2019 | Morris et al. |
| 2014/0046552 A1 | 2/2014 | Tsuruga et al. |

FOREIGN PATENT DOCUMENTS

| | | |
|---|---|---|
| CN | 103953619 A | 7/2014 |
| CN | 21177334 U | 10/2020 |
| DE | 10 2009 034212 A | 2/2011 |

\* cited by examiner

ELECTRO-HYDRAULIC POWER UNIT WITH VARIABLE OUTPUT FLOW

CROSS REFERENCE TO RELATED APPLICATION

The present application claims priority to: (i) U.S. Provisional patent application No. 63/216,620, filed on Jun. 30, 2021, (ii) U.S. Provisional patent application No. 63/226,209, filed on Jul. 28, 2021, and (iii) U.S. Provisional patent application No. 63/248,795, filed on Sep. 27, 2021, the entire contents of all of which are herein incorporated by reference as if fully set forth in this description.

BACKGROUND

A hydraulic power unit, which can also be referred to as a hydraulic power pack, is a self-contained system that generally includes a motor, a fluid reservoir, and a pump. It provides hydraulic fluid flow to drive motors, cylinders, and other complementary parts of a given hydraulic system.

The motor can be an internal combustion engine. However, there is a trend to electrify hydraulic systems, and an electric motor can be used to drive the pump.

In some applications, to reduce cost, the power unit may include an electric motor running at a constant speed and driving a fixed displacement pump (i.e., a pump configured to provide a particular amount of fluid flow rate at a given motor speed). As such, the power unit provides fluid flow continually regardless of the demand of the hydraulic system, i.e., without being capable of sensing the behavior of the external hydraulic system. This configuration can lead to wasting a substantial amount of energy, thereby reducing the efficiency of the hydraulic system. Further, when the hydraulic system does not require fluid flow, the output power of the power unit is typically wasted as heat, which can reduce the life of the system and power unit.

The power unit and hydraulic system can be made more efficient by using complicated components, pressure compensation, several sensors, and complex controls for the electric motor. However, such a system can be expensive and might not be suitable for many applications.

It may thus be desirable to have a power unit that varies the amount of fluid flow rate to meet the demand of the hydraulic system, while not adding complexity and cost to the system. It is with respect to these and other considerations that the disclosure made herein is presented.

SUMMARY

The present disclosure describes implementations that relate to an electro-hydraulic power unit with variable output flow.

In a first example implementation, the present disclosure describes a system. The system includes: (i) an electric motor: (ii) a pump coupled to, and driven by, the electric motor; (iii) a hydraulic circuit fluidly-coupled to the pump and configured to receive fluid flow from the pump: (iv) a hydraulic line fluidly-coupled to the hydraulic circuit, wherein the hydraulic circuit is configured to provide a fluid signal to the hydraulic line, wherein the fluid signal is indicative of a fluid flow demand of the hydraulic circuit: (v) a pressure sensor mounted to the hydraulic line and configured to provide sensor information indicative of pressure level of fluid in the hydraulic line; and (vi) a controller. The controller is configured to perform operations comprising: receiving the sensor information from the pressure sensor, and based on the pressure level indicated by the sensor information, controlling a speed of the electric motor to vary fluid flow rate provided by the pump to the hydraulic circuit to meet the fluid flow demand.

In a second example implementation, the present disclosure describes an electrohydraulic power unit. The electrohydraulic power unit includes: (i) an electric motor; (ii) a pump coupled to, and driven by, the electric motor, wherein the pump is configured to provide fluid flow to a hydraulic circuit external to the electrohydraulic power unit: (iii) a pressure sensor configured to measure a pressure level of a fluid signal received from the hydraulic circuit, wherein the fluid signal is indicative of a fluid flow demand of the hydraulic circuit: and (iv) a controller. The controller is configured to perform operations comprising: receiving sensor information from the pressure sensor indicating the pressure level of the fluid signal, and based on the pressure level indicated by the sensor information, controlling a speed of the electric motor to vary fluid flow rate discharged from the pump to meet the fluid flow demand of the hydraulic circuit.

In a third example implementation, the present disclosure describes a method. The method includes: receiving, at a controller of an electrohydraulic power unit, sensor information from a pressure sensor mounted to a hydraulic line that fluidly couples the electrohydraulic power unit to a hydraulic circuit external to the electrohydraulic power unit, wherein the electrohydraulic power unit comprises an electric motor and a pump coupled to, and driven by, the electric motor, wherein the pump provides fluid flow to the hydraulic circuit, and wherein the hydraulic circuit provides a fluid signal to the hydraulic line, wherein the fluid signal is indicative of a fluid flow demand of the hydraulic circuit; and based on the sensor information indicating a pressure level of the fluid signal in the hydraulic line, controlling a speed of the electric motor to vary fluid flow rate provided by the pump to the hydraulic circuit to meet the fluid flow demand.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Disclosed herein are systems and electrohydraulic power units that can operate efficiently without using complex electro-hydraulic components, systems, or configurations. An example power unit includes an electric motor driving a pump to provide fluid flow to an external hydraulic circuit. A fluid signal is generated by the hydraulic circuit, where the fluid signal is indicative of a fluid flow demand (e.g., the fluid flow rate required to operate the hydraulic circuit) in a desired state. A pressure sensor is configured to provide sensor information indicating pressure level of the fluid signal to a controller of the electric motor. The controller then changes the speed of the electric motor to decrease or increase the speed based on the sensor information.

In an example, a fixed displacement pump is used. A fixed-displacement pump is a positive displacement type where the amount of displacement (or amount of fluid pumped per revolution of the pump's input shaft) cannot be varied while operating at a given speed. In this case, changing the speed of the electric motor is used to change the fluid flow rate output of the pump.

In another example, a variable displacement pump is used. With a variable displacement pump, the displacement, or amount of fluid pumped per revolution of the pump's input shaft, can be varied while the pump is running. For example, the pump can have a swash plate, the angle of which determines the displacement of the pump, and thus varying the swash plate angle varies the displacement of the pump. In an example, the angle of the swash plate can be used to change the amount of fluid flow output by the pump. In another example, the electric motor can be used to change the speed of the input shaft to control the amount of fluid flow rate, while the angle of the swash plate can be changed to vary the torque load on the electric motor.

As such, the disclosed systems and power units can provide a power output that meets is the demand of the hydraulic circuit, without producing excess power that is wasted. This way the efficiency of the system can be enhanced.

Figure 1:
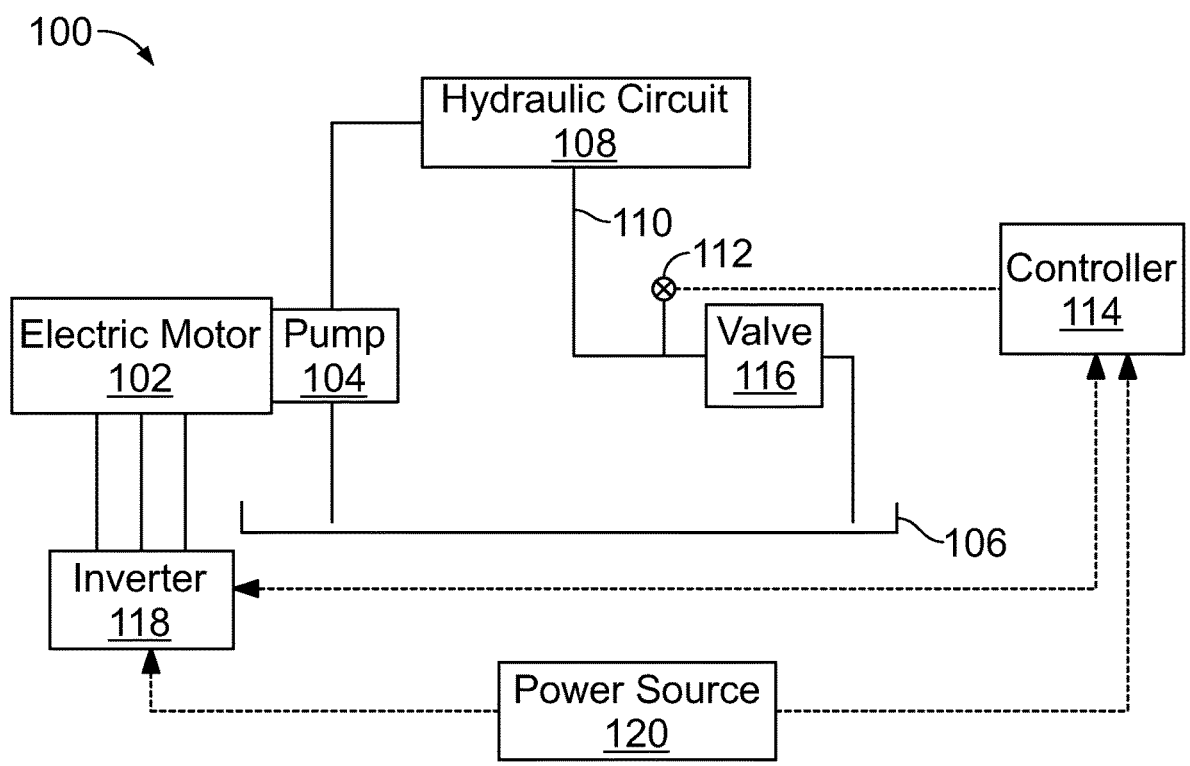
FIG. 1 illustrates a block diagram of a system, in accordance with an example implementation.

FIG. 1 illustrates a block diagram of a system 100, in accordance with an example implementation. The system 100 has an electrohydraulic power unit including an electric motor 102 driving a pump 104 (i.e., the output shaft of the electric motor 102 is coupled to the input shaft of the pump 104).

The pump 104 draws fluid from a fluid reservoir 106, which is configured as a hydraulic fluid tank storing or containing hydraulic fluid at a low pressure level, e.g., 0-70 pounds per square inch (psi). The pump 104 then provides fluid flow to a hydraulic circuit 108. The hydraulic circuit 108 can include several hydraulic components such as valves and actuators (e.g., hydraulic cylinder or motors). As such, the fluid flow provided by the pump 104 drives the actuators of the hydraulic circuit 108.

The hydraulic circuit 108 is configured to generate a fluid signal in a hydraulic line 110 coupled to the hydraulic circuit 108. The fluid signal is configured such that the pressure level of the fluid signal provides an indication of whether fluid flow is demanded by the hydraulic circuit 108. If fluid flow is demanded by the hydraulic circuit 108, the pressure level of the fluid signal can further provide an indication of the amount of fluid flow rate demanded by the hydraulic circuit 108 to operate the hydraulic circuit 108 in a desired or commanded state.

The system 100 includes a pressure sensor 112 disposed in the hydraulic line 110, and is configured to provide sensor information indicative of the pressure level of the fluid signal in the hydraulic line 110. The system 100 also includes a controller 114 that receives the sensor information from the pressure sensor 112.

The fluid signal in the hydraulic line 110 can then be provided to the fluid reservoir 106. In an example, the system 100 includes a valve 116 or other component that is fluidly-coupled to the hydraulic line 110 and receives the fluid signal from the hydraulic circuit 108. As described below, the valve 116 is configured to create counter-pressure or back-pressure effect to allow pressure level to increase in the hydraulic line 110. The valve 116 can further be configured to limit the pressure level of the fluid signal, and preclude back-flow from the fluid reservoir 106 to the hydraulic line 110.

The controller 114 can have a microprocessor that can include one or more processors. A processor can include a general purpose processor (e.g., an INTEL® single core microprocessor or an INTEL® multicore microprocessor), or a special purpose processor (e.g., a digital signal processor, a graphics processor, or an application specific integrated circuit (ASIC) processor). A processor can be configured to execute computer-readable program instructions (CRPI) to perform the operations described throughout herein. A processor can be configured to execute hard-coded functionality in addition to or as an alternative to software-coded functionality (e.g., via CRPI).

The controller 114 is configured to control the speed of the electric motor 102 via an inverter 118. The inverter 118 can include, for example, an arrangement of semiconductor switching elements (transistors) that can support conversion of direct current (DC) electric power provided from a power source 120 (e.g., a battery or electric generator) to three-phase electric power capable of driving the electric motor 102. The power source 120 can also be electrically-coupled to the controller 114 to provide power thereto and receive commands therefrom.

In particular, the controller 114 can control the speed of the electric motor 102 in response to or based on the pressure level indicated by the sensor information received from the pressure sensor 112. This way, the controller 114 can vary the speed of the electric motor 102 such that the pump 104 produces a particular fluid flow rate demanded by the hydraulic circuit 108.

If the hydraulic circuit 108 does not demand fluid flow or demands a small amount of fluid flow, the electric motor 102 is commanded to rotate at a low standby speed so as to avoid producing excessive fluid flow that is then wasted as heat. If the hydraulic circuit 108 demands more flow, the pressure level of the fluid signal in the hydraulic line 110 changes, and the controller 114 responsively increases the speed of the electric motor 102 to generate the required fluid flow from the pump 104.

Components of the system 100 may be configured to work in an interconnected fashion with each other and/or with other components coupled to respective systems. One or more of the described operations or components of the system 100 may be divided up into additional operational or physical components, or combined into fewer operational or physical components. In some further examples, additional operational and/or physical components may be added to the system 100. For example, the controller 114 and the inverter 118 can be combined into a single package. The electrohydraulic power unit can include the electric motor 102, the pump 104, and the fluid reservoir 106 in a single package with fluid and electric connections connected to other parts of the system 100. The electrohydraulic power unit can also include the controller 114 and the inverter 118.

Figure 2:
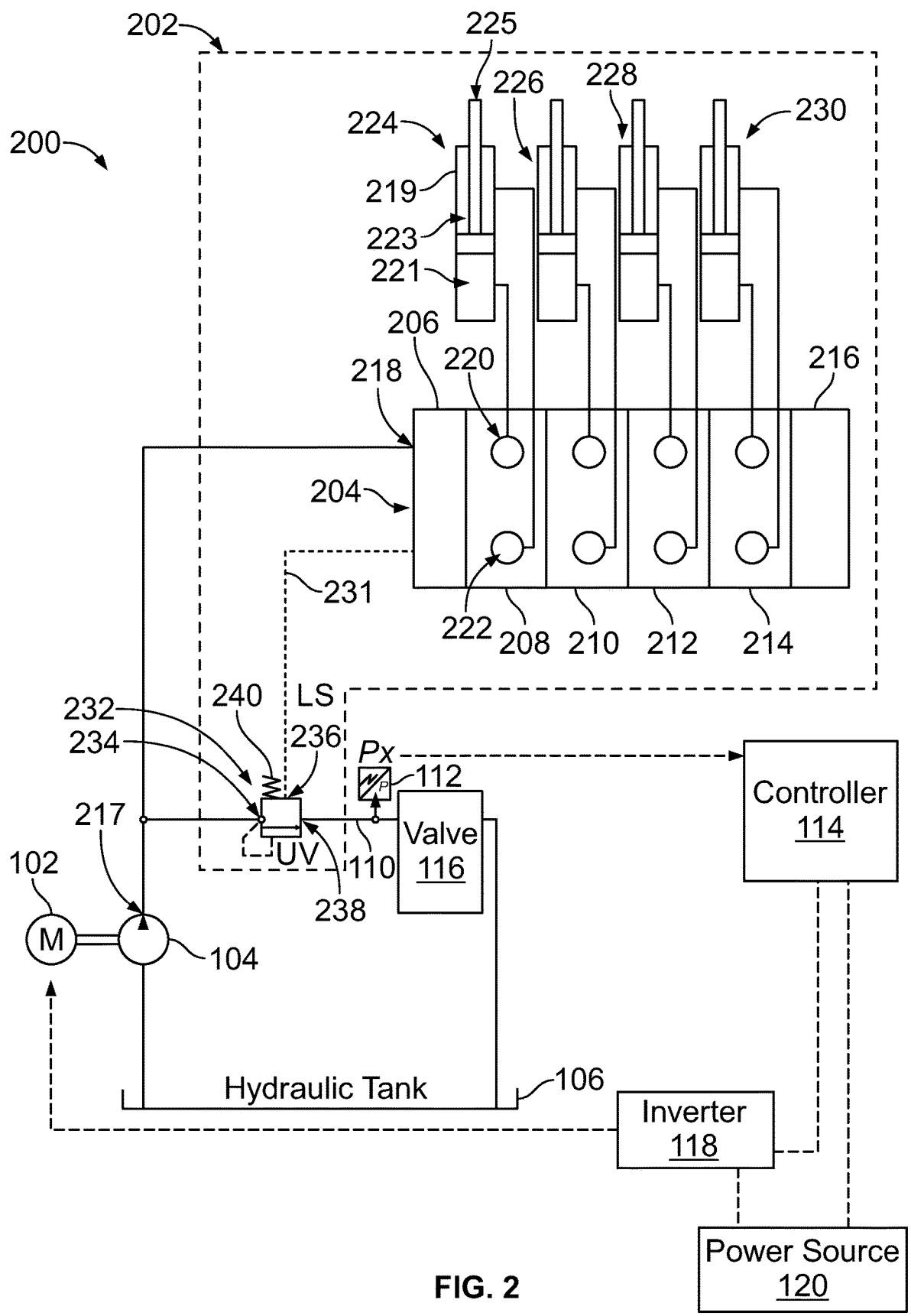
FIG. 2 illustrates a system with a hydraulic circuit having a valve assembly configured to provide a load-sense fluid signal, in accordance with an example implementation.
Figure 5:
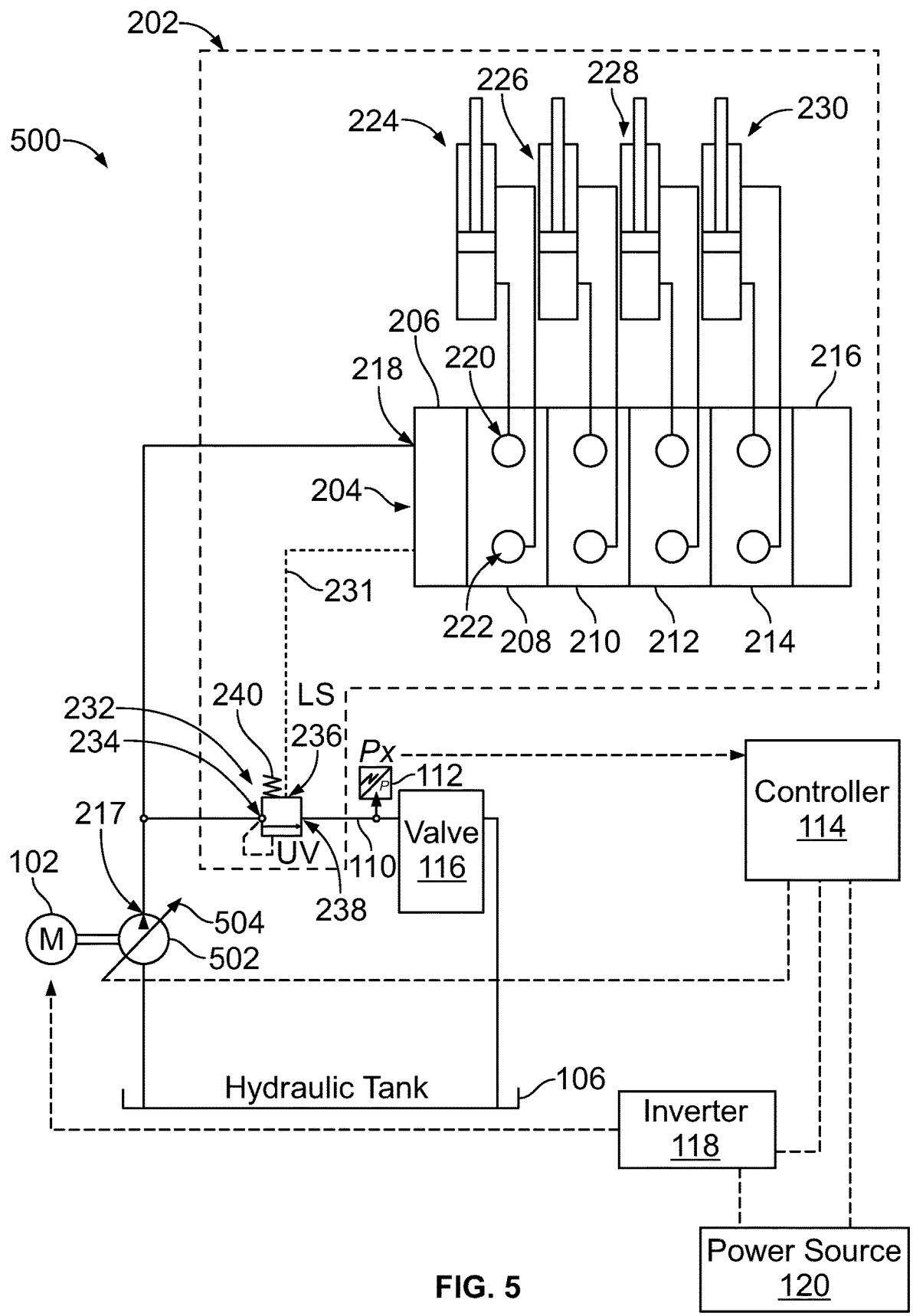
FIG. 5 illustrates a system with a variable displacement pump, in accordance with an example implementation.
Figure 6:
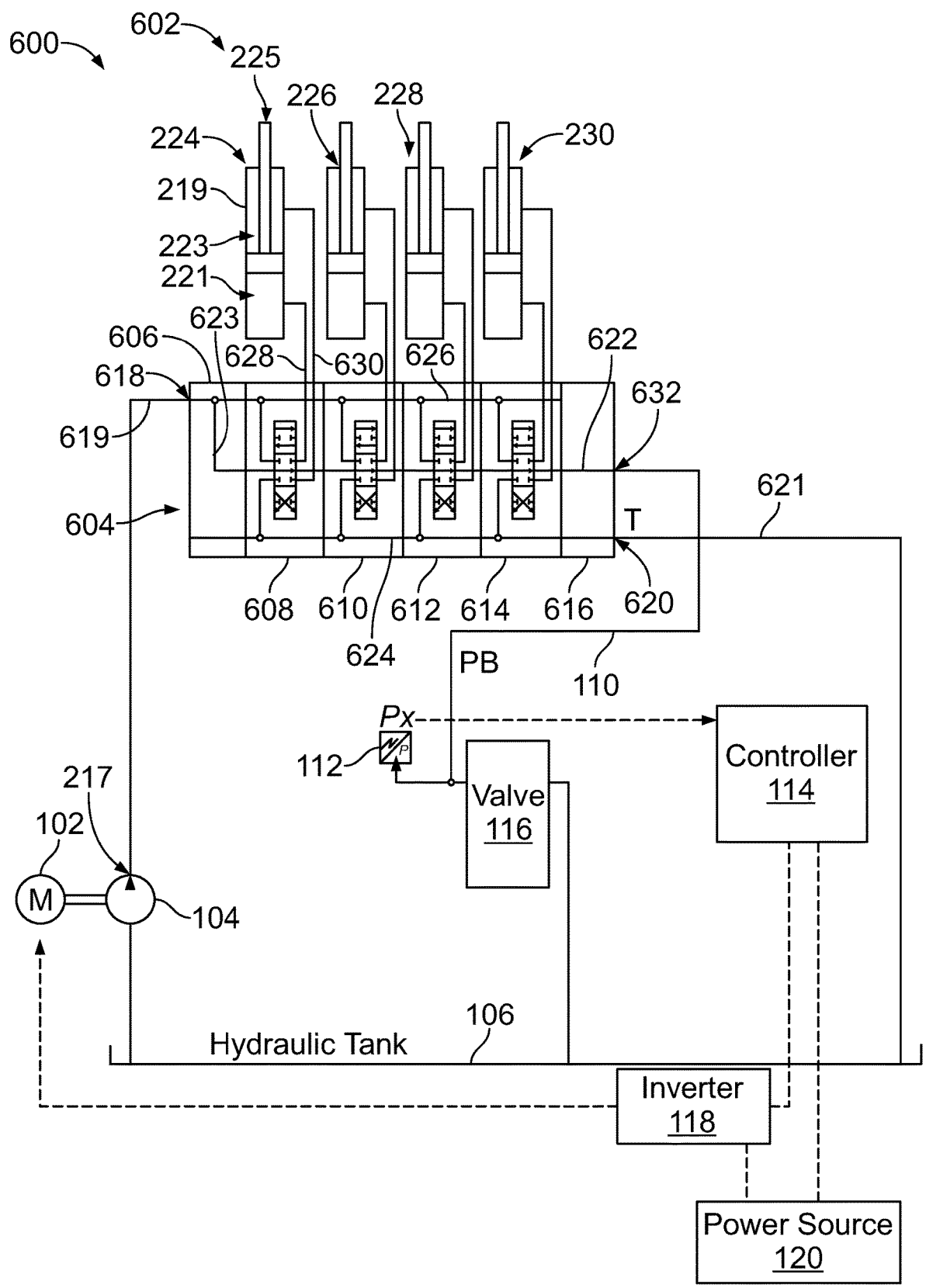
FIG. 6 illustrates a system with a hydraulic circuit having a valve assembly with an open center configuration, in accordance with an example implementation.

The implementation of the system 100 can take various forms based on the configuration of the hydraulic circuit 108. For example, the hydraulic circuit 108 can include a closed-center valve, a load-sensing valve, or an open center valve. As another example, the pump 104 can be a fixed displacement pump or a variable displacement pump. FIGS. 2, 5, and 6 provide example implementations of the system 100 in various configurations.

FIG. 2 illustrates a system 200 with a hydraulic circuit 202 having a valve assembly 204 configured to provide a load-sense fluid signal, in accordance with an example implementation. The system 200 is an example implementation of the system 100 when the hydraulic circuit 108 includes a load-sensing valve. Components that are similar between the system 100 and the system 200 are designated with the same reference numbers.

As depicted, the electric motor 102 drives the pump 104, which is configured as a fixed displacement pump in FIG. 2, and the pump 104 provides fluid flow to the hydraulic circuit 202. The hydraulic circuit 202 is an external circuit relative to the power unit and is not part of the power unit. Rather, the power unit, which includes the electric motor 102 and the pump 104 provides hydraulic power to operate the hydraulic circuit 202.

The valve assembly 204 includes an inlet section 206, a first worksection 208, a second worksection 210, a third worksection 212, a fourth worksection 214, and an outlet section 216. The inlet section 206, the worksections 208-214, and the outlet section 216 can be coupled together by fasteners (e.g., bolts screws, clamps, tie rods, etc.) to provide an assembly of valve sections. The outlet section 216 can receive fluid from any of the inlet section 206 and/or the worksections 208-214.

As shown in FIG. 2, the pump 104 receives fluid from the fluid reservoir 106 to provide fluid flow to the valve assembly 204. Particularly, an outlet port 217 of the pump 104 is fluidly-coupled to an inlet port 218 disposed in the inlet section 206 of the valve assembly 204 such that output fluid flow from the pump 104 is received at the inlet port 218.

The valve assembly 204 is also configured to be fluidly-coupled to a fluid reservoir such as the fluid reservoir 106 or a different fluid reservoir. For example, the inlet section 206 or the outlet section 216 can have a tank port (not shown) that is fluidly-coupled to the fluid reservoir 106. This way, fluid is allowed to return to the fluid reservoir 106 from the valve sections of the valve assembly 204 through the tank port. The tank port and the fluid connection from the valve assembly 204 to the fluid reservoir 106 is not shown to reduce visual clutter in the drawing.

Each worksection of the worksections 208-214 is configured to control fluid flow to and from a hydraulic actuator such as a hydraulic cylinder or hydraulic motor. For example, the first worksection 208 includes a first workport 220 and a second workport 222 that are fluidly-coupled to corresponding ports of a hydraulic cylinder actuator 224. The hydraulic cylinder actuator has a cylinder 219 divided into a first chamber 221 and a second chamber 223 via piston 225 that is movable within the cylinder. Particularly, as depicted, the piston 225 has a piston head that divides the cylinder into the first chamber 221 and the second chamber 223, and a piston rod that extends from the piston head along a longitudinal axis of the cylinder.

The piston rod can be coupled to an implement or other movable component to exert forces on objects and be subjected to forces. For example, if the hydraulic circuit 202 controls a hydraulic mobile machinery such as a backhoe or excavator, the piston rod can be coupled to an implement such as a bucket or arm to move the implement and dig in the ground or move material from one location to another. Thus, the hydraulic actuators apply forces and are subjected to forces that induce pressures in the chambers (e.g., the chambers 221, 223) of the hydraulic actuator during operation of the machinery.

The other worksections 210-214 are similarly configured to control fluid flow to and from respective actuators. As depicted, the worksection 210 has workports that control fluid flow to and from a hydraulic cylinder actuator 226, the worksection 212 has workports that control fluid flow to and from a hydraulic cylinder actuator 228, and the worksection 214 has workports that control fluid flow to and from a hydraulic cylinder actuator 230. The hydraulic cylinder actuators 226-230 are configured similar to the hydraulic cylinder actuator 224. In other examples, the hydraulic circuit 202 can include other types of actuators such as hydraulic motors.

Each of the worksections 208-214 can include a respective spool movable in a spool bore within the respective worksection. The spool can be actuated in either direction via various types of mechanisms. As an example for illustration, the spools can be actuated manually where an operator can move a joystick or handle connected to the spool and can thus move the spool manually. In another example, the spool can be actuated via hydraulic pilot fluid signal where an operator moves a joystick, and responsively, a hydraulic fluid signal is provided to one side of the spool to move the spool in a given direction.

When the spool moves in a given direction, fluid is provided to the respective hydraulic cylinder actuator to move a piston thereof in a first direction. When the spool moves in an opposite direction, fluid is provided to the respective hydraulic cylinder actuator to move the piston in a second direction, opposite the first direction. The larger the stroke of the spool, the larger the amount of fluid flow to the hydraulic cylinder actuator. In other words, the larger the stroke of the spool, the larger the fluid flow demand by the hydraulic cylinder actuator.

As mentioned above, the valve assembly 204 is configured to be a load-sensing valve. When the piston of a hydraulic cylinder actuator applies a force or is subjected to force, fluid pressure level in at least one of the chambers (e.g., the chambers 221, 223) of the hydraulic cylinder actuator increases. The pressure in the chambers can be referred to as load-induced pressure. Such pressure level in the chamber is indicative of the force or load that the piston applies or is subjected to.

Each worksection includes a respective load-sense passage, and when a spool of a worksection is actuated to provide fluid to a respective hydraulic cylinder actuator, the load-sense passage is fluidly-coupled to the hydraulic cylinder actuator via the respective workport of the worksection. Thus, the load-sense passage provides or transmits a pressure feedback signal from the workport, wherein the pressure feedback signal indicates the load on the hydraulic cylinder actuator.

As such, the pressure feedback signal may be referred to as a load-sense fluid pressure signal. When a load-sense fluid pressure signal is generated or the load-sense fluid pressure signal has a non-zero pressure level, then the respective hydraulic cylinder actuator has been actuated and thus fluid flow is demanded. Conversely, when the hydraulic cylinder actuator is not commanded to move, the spool of the associated worksection is not actuated and no load-sense fluid pressure signal is generated. In other words, the load-sense fluid pressure signal has a pressure level of zero psi. Thus, if the load-sense fluid pressure signal has a pressure level of zero psi (e.g., no signal is generated) no fluid flow is demanded by the corresponding hydraulic cylinder actuator. As such, the load-sense fluid pressure signal generated by a worksection provides an indication of whether fluid flow is demanded by the hydraulic cylinder actuator controlled by the worksection.

Each worksection of the worksections 208-214 is configured to produce a respective load-sense fluid pressure signal. The valve assembly 204 can further includes a network of check valves and/or shuttle valves that compares the pressure levels of the different load-sense fluid pressure signals, and then outputs the load-sense fluid pressure signal having the highest pressure level. This load-sense fluid pressure signal is a "universal" or "global" load-sense fluid pressure signal indicative of the highest load that the hydraulic cylinder actuators controlled by the valve assembly 204 are subjected to.

The load-sense fluid pressure signal is then provided to a hydraulic line 231, which is fluidly-coupled to the valve assembly 204. Although the hydraulic line 231 is shown in FIG. 2 to be connected to the inlet section 206, in other example implementation, the hydraulic line 231 can be fluidly-coupled to other sections such as the outlet section 216 or other blocks/manifolds coupled to the valve assembly 204.

The system 100 further includes an unloading valve 232. Although the unloading valve 232 is shown external to the valve assembly 204, in other example implementations, the unloading valve 232 can be disposed within or integrated within the valve assembly 204. For instance, the unloading valve 232 can be integrated within the inlet section 206. Thus, the hydraulic circuit 202 can be considered to include the valve assembly 204, the hydraulic cylinder actuators 224-230, and the unloading valve 232.

The unloading valve 232 has an inlet port 234 that is fluidly-coupled to the outlet port 217 of the pump 104. The unloading valve 232 also has a pilot port 236 that is fluidly-coupled to the hydraulic line 231, and thus receives the load-sense fluid pressure signal indicative of the highest load among the loads of the hydraulic cylinder actuators 224-230.

The unloading valve 232 further includes an outlet port 238 that is fluidly-coupled to the valve 116 via the hydraulic line 110. The pressure sensor 112 is disposed in the hydraulic line 110 that fluidly couples the outlet port 238 to the valve 116. This way, the pressure sensor 112 is configured to provide sensor information indicative of pressure level of fluid discharged from the outlet port 238.

The unloading valve 232 includes a movable element such as a poppet, spool, or piston therein, and also includes a spring 240 applying a biasing force on the movable element toward a seat. When seated, the movable element blocks fluid flow from the inlet port 234 to the outlet port 238.

The load-sense fluid pressure signal received at the pilot port 236 applies a first fluid force on the movable element toward the seat. As such, the first fluid force of the load-sense fluid pressure signal and the biasing force of the spring 240 cooperate to drive the movable element toward a seated position. Thus, the combined force or resultant force comprising the first fluid force of the load-sense fluid pressure signal and the biasing force of the spring 240 can be referred to as a closing force.

On the other hand, fluid received from the pump 104 at the inlet port 234 applies a second fluid force on the movable element that opposes the closing force, i.e., the second fluid force tends to act on the movable element to be unseated. Thus, the second fluid force can be referred to as an opening force.

As long as the opening force of fluid from the pump 104 does not exceed the closing force, the unloading valve 232 remains closed and no fluid flow is allowed from the inlet port 234 to the outlet port 238. In other words, pressure level in the hydraulic line 110 is substantially zero (e.g., between zero and a low pressure valve such as 5-10 psi).

The closing force can remain larger than the opening force when most of the fluid flow from the pump 104 is provided to, and consumed by, the valve assembly 204. For example, if several spools of several worksections of the worksections 208-214 are actuated at the same time (or one spool is actuated to a maximum stroke to move an actuator at maximum speed), most of the fluid output by the pump 104 is consumed by the valve assembly 204 and provided to the hydraulic cylinder actuator(s).

In some cases, the flow demanded by the hydraulic cylinder actuators 224-230 may exceed the flow capacity of the pump 104 at a given speed of the electric motor 102. Thus, all the flow produced by the pump 104 is provided to the valve assembly 204, and the pressure level of fluid at the inlet port 234 of the unloading valve 232 is not sufficient to overcome the closing force applied by the load-sense fluid pressure signal and the spring 240. This way, the pressure level in the hydraulic line 110 remains low (e.g., zero).

In this case, the pressure sensor 112 indicates to the controller 114 that the flow demand exceeds the capacity of the pump 104 at the current motor speed. Responsively, the controller 114 can command the electric motor 102 to increase the speed and increase the flow output of the pump 104. For example, if the pressure level in the hydraulic line 110 is zero, the controller 114 can command the electric motor 102 to operate at maximum speed.

If the pressure level of the fluid received from the pump 104 at the inlet port 234 increases such that the opening force exceeds the closing force, the movable element of the unloading valve 232 is lifted off its seat and fluid flows from the inlet port 234 to the outlet port 238. The unloading valve 232 is configured as a proportional valve such that the amount of fluid flow passing therethrough is proportional to the difference in pressure level between the fluid at the inlet port 234 and fluid at the pilot port 236.

Particularly, the larger the pressure differential between the fluid at the inlet port 234 and the load-sense fluid pressure signal at the pilot port 236, the larger the movement of the movable element of the unloading valve 232, and thus the larger the opening through the unloading valve 232, thereby causing a larger amount of fluid flow to the outlet port 238. Conversely, the smaller the pressure differential between the fluid at the inlet port 234 and the load-sense fluid pressure signal at the pilot port 236, the smaller the amount of fluid flow through the unloading valve 232. As such, the pressure level of the fluid signal output from the outlet port 238 to the hydraulic line 110 is based on a difference between the second fluid force and a combination of the first fluid force and the biasing force.

The valve 116 is configured to restrict the fluid flow to the fluid reservoir 106. Thus, the larger the fluid flow rate through the hydraulic line 110, the larger the pressure level induced in the hydraulic line 110 (i.e., the back pressure) due to the presence of the valve 116. With this configuration, when the pump 104 provides a larger amount of fluid flow than demanded by the valve assembly 204 and the hydraulic cylinder actuators 224-230, the fluid flow rate through the hydraulic line 110 and the pressure level therein increase. Such increase in pressure level is provided by the pressure sensor 112 to the controller 114, which responsively reduces the speed of the electric motor 102 to reduce the fluid flow output of the pump 104.

With this configuration, the controller 114 modifies, changes, or adjusts the speed of the electric motor 102 such that the speed of the electric motor 102 has an inverse relation with the pressure level in the hydraulic line 110 indicated by the pressure sensor 112. If flow demand by the hydraulic circuit 202 (e.g., by the hydraulic cylinder actuators 224-230) increases, the pressure level of fluid output by the pump 104, and thus the pressure level of fluid provided to the hydraulic line 110 decreases and can reach zero when the flow demand exceeds the pump capacity at a given motor speed. Responsively, the controller 114 increases the speed of the electric motor 102 to cause the pump 104 to increase flow output to an amount that meets the flow demand.

Conversely, if flow demand by the hydraulic circuit 202 (e.g., by the hydraulic cylinder actuators 224-230) decreases, the pressure level of fluid output by the pump 104, and thus the pressure level of fluid provided to the hydraulic line 110 increases as the pump 104 provides more flow than being consumed by the valve assembly 204. Responsively, the controller 114 decreases the speed of the electric motor 102 to cause the pump 104 to decrease flow output to an amount that meets the flow demand. This way, the system 200 operates efficiently as the pump 104 provides sufficient flow to operate the hydraulic circuit 202, as opposed to providing a particular fixed amount of fluid flow output regardless of the flow demand.

In an example, the inverse relation between the speed of the electric motor 102 and the pressure level in the hydraulic line 110 can be an inverse proportional relationship. For instance, if the pressure level in the hydraulic line 110 is 280 psi, the controller 114 operates the electric motor 102 at a standby speed, e.g., 600 revolutions per minute (RPM). If the pressure level in the hydraulic line 110 decreases to 0 psi (over-demand scenario where all flow from the pump 104 is consumed by the hydraulic cylinder actuators 224-230), the controller 114 operates the electric motor 102 at a maximum speed, e.g., 2000 RPM. An inverse proportional relationship, indicates that the controller 114 varies the speed linearly with the pressure level such that as the pressure level increases, the speed decreases and vice versa. However, in other examples, the inverse relationship is not linear. Rather, an inverse non-linear relationship or schedule can be tuned as desired.

Without the valve 116, the hydraulic line 110 is directly coupled to the fluid reservoir 106, and thus pressure level in the hydraulic line 110 remains at a pressure level substantially equal to the pressure level of fluid in the fluid reservoir 106 regardless of flow demand. The presence of the valve 116 allows pressure level in the hydraulic line 110 to vary, thereby indicating the amount of flow demand by the hydraulic circuit 202.

The valve 116 can take several forms. As mentioned above, the valve 116 is configured to create a counter or back pressure and allow pressure level in the hydraulic line 110 to increase. Further, the valve 116 can be configured to limit the maximum pressure level in the hydraulic line 110. The valve 116 can also be configured to preclude back-flow from the fluid reservoir 106 to the hydraulic line 110. As such, the valve 116 can be a relief valve or any valve or combination of components that mimics the operation of a relief valve.

Figure 3:
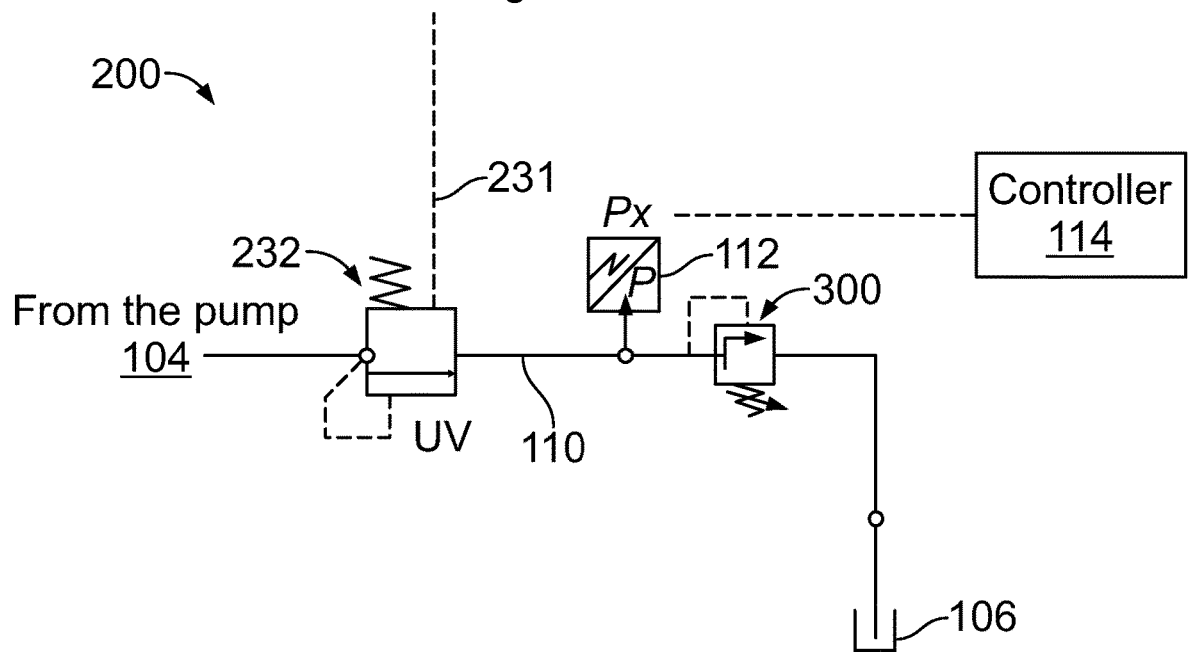
FIG. 3 illustrates a partial view of the system of FIG. 2 with a relief valve, in accordance with an example implementation.

FIG. 3 illustrates a partial view of the system 200 with the valve 116 configured as a relief valve 300, in accordance with an example implementation. The relief valve 300 is a pressure relief valve (PRV) configured to control or limit the pressure in the hydraulic line 110. When the pressure level of fluid from the pump 104 is sufficient to overcome the load-sense fluid pressure signal and the biasing force of the spring 140, the unloading valve 232 opens and fluid flows to the hydraulic line 110.

Pressure of fluid in the hydraulic line 110 can increase or build up until it reaches a pressure setting of the relief valve 300. When the pressure setting is exceeded, the relief valve 300 opens, and fluid is allowed to flow to the fluid reservoir 106. Once the pressure level is reduced to a level less than the pressure setting (e.g., when flow demand of the hydraulic circuit 202 increases), the relief valve 300 closes again. Thus, the relief valve 300 allows pressure level to vary in the hydraulic line 110, thereby enabling the pressure sensor 112 to measure the pressure level in the hydraulic line 110 and provide an indication of the flow demand by the hydraulic circuit 202 as described above to the controller 114.

Further, the relief valve 300 can also limit the pressure level in the hydraulic line 110 such that it does not exceed a threshold value (e.g., 300 psi). This way, pressure level in the hydraulic line 110 is allowed to vary between zero and a maximum pressure level value, and the controller 114 can vary the speed of the electric motor 102 inversely with the pressure level in the range between a maximum motor speed and a standby speed.

Also, the relief valve 300 prevents back-flow from the fluid reservoir 106 into the hydraulic line 110. For example, if pressure level in the hydraulic line 110 is zero when the unloading valve 232 is closed, and pressure level of fluid in the fluid reservoir 106 is slightly higher than zero, fluid can back flow to the hydraulic line 110. The relief valve 300 blocks such back-flow from the fluid reservoir 106 such that the pressure level in the hydraulic line 110 provides an accurate indication of the flow demanded by the hydraulic circuit 202.

Figure 4:
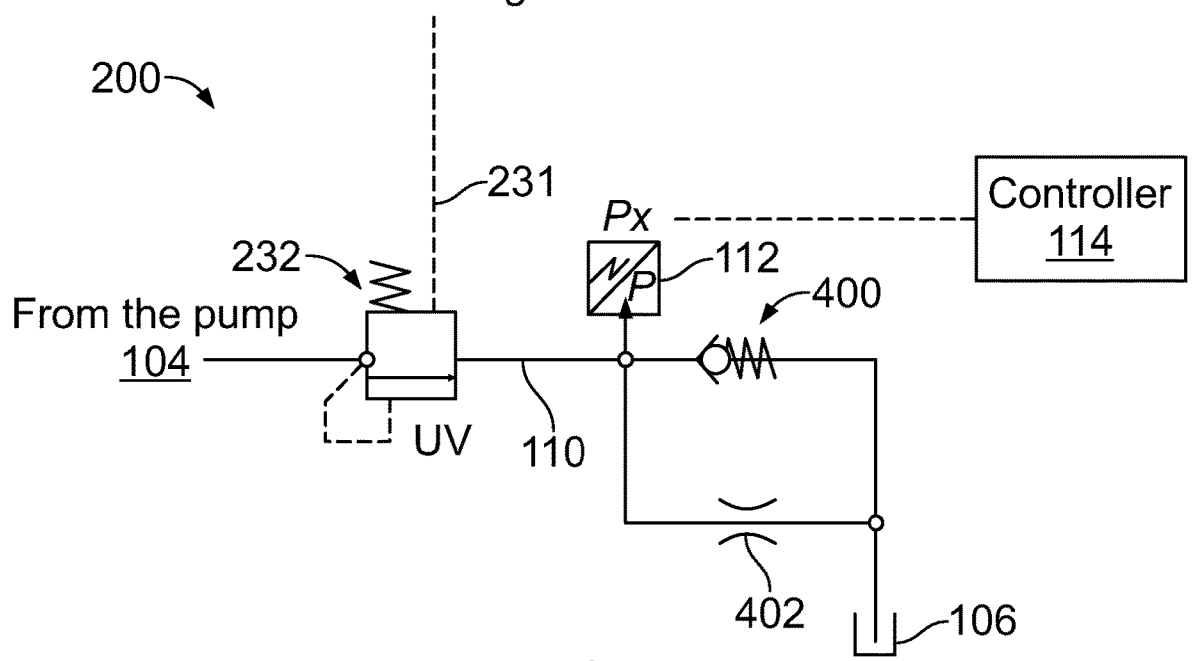
FIG. 4 illustrates a partial view of the system of FIG. 2 with a combination of a spring-loaded check valve in parallel with an orifice, in accordance with an example implementation.

Other configurations can be used to accomplish the same operations of the relief valve 300 described above. FIG. 4 illustrates a partial view of the system 200 with the valve 116 configured as a combination of a spring-loaded check valve 400 in parallel with an orifice 402, in accordance with an example implementation. Both the spring-loaded check valve 400 and the orifice 402 fluidly couple the hydraulic line 110 to the fluid reservoir 106.

The spring-loaded check valve 400 can have a movable element such as a ball or poppet biased by a spring toward a seated position. As long as pressure level of fluid in the hydraulic line 110 is not sufficient to overcome the spring, the movable elements remains seated, blocking fluid flow to the fluid reservoir 106.

The orifice 402 can be configured to have a small size such that the orifice 402 is "saturated," with a small amount of fluid flow, i.e., allows pressure level of fluid in the hydraulic line 110 to increase or build up as the orifice 402 restricts fluid flow to the fluid reservoir 106. Pressure level of fluid in the hydraulic line 110 is allowed to increase until it reaches a pressure setting determined by the spring of the spring-loaded check valve 400. Once the pressure setting is reached, the spring-loaded check valve 400 opens to allow fluid flow to the fluid reservoir 106. With this configuration, the combination of the spring-loaded check valve 400 and the orifice 402 can operate similar to the relief valve 300.

As mentioned above, in the system 200, the pump 104 is configured as a fixed displacement pump. Thus, the pump 104 provides a fixed amount of fluid flow at a particular speed of the electric motor 102. To vary the output flow rate of the pump 104, the controller 114 changes the speed of the electric motor 102. In other example implementations, a variable displacement pump can be used. In this example, in addition or alternative to changing the speed of the electric motor 10 to change fluid flow rate, the controller 114 can change the displacement of the pump to change the fluid flow rate output by the pump. In another example, the controller 114 can change the displacement of the pump so as to change the torque load on the electric motor 102 in addition to the varying the speed of the electric motor 102. This way, the controller 114 can control the pressure level and flow rate of fluid output by the pump 104.

FIG. 5 illustrates a system 500 with a variable displacement pump 502, in accordance with an example implementation. The system 500 is an example implementation of the system 100. Also, the system 500 is the same as the system 200 except that rather than using a fixed displacement pump, the electric motor 102 drives a variable displacement pump.

The variable displacement pump 502 can have a block or cylinder housing a plurality of pistons therein. A spring pushes each piston against a swash plate 504 that is stationary. When the swash plate 504 is not tilted and the cylinder rotates, the variable displacement pump 502 does not discharge fluid. However, when the swash plate 504 is tilted such that it forms an angle relative to the block having the pistons, as the block rotates the pistons suck in fluid during half a revolution and push fluid out during the other half. Varying the tilt angle of the swash plate 504 varies the flow rate of fluid discharged from the variable displacement pump 502. For example, the greater the angle, the further the pistons move, and the higher the fluid flow rate.

For a given motor speed of the electric motor 102, varying the angle of the swash plate 504 varies the power output of the power unit. The power output can be determined as a multiplication of the flow rate by the pressure level of fluid output by the variable displacement pump 502 or a multiplication of the speed of the electric motor 102 by a torque applied by the electric motor 102 on the variable displacement pump 502. Thus, for a given motor speed, varying the angle of the swash plate 504 can control the torque of the electric motor 102.

The variable displacement pump 502 can have a control actuator mechanism that controls the angle of the swash plate 504. For example, a cylinder-piston arrangement can be used, where a piston is coupled to the swash plate 504. A solenoid valve can control fluid flow to the cylinder to move the piston and the swash plate 504 coupled thereto. The controller 114 is in communication with and is configured to command such solenoid valve. As such, the controller 114 can vary the angle of the swash plate 504 to control the torque load on the electric motor 102.

This way, by controlling both the speed and the torque of the electric motor 102, the controller 114 can adjust the output power of the electric motor 102. As such, the controller 114 can vary the power consumption from the power source 120. For instance, if the power source 120 is a battery, the controller 114 can increase the life of the battery and the inverter 118 by reducing power consumption when temperature level of either the battery or the inverter 118 exceeds a threshold value.

The systems 200, 500 are example implementations of the system 100. Other examples are possible. For example, rather than having a load-sensing closed-center valve assembly such as the valve assembly 204, the methods and systems described herein can be used with an open-center valve.

FIG. 6 illustrates a system 600 with a hydraulic circuit 602 having a valve assembly 604 with an open-center configuration, in accordance with an example implementation. The system 600 is an example implementation of the system 100 when the hydraulic circuit 108 includes an open-center valve configuration. Components that are similar between the systems 100, 200 and the system 600 are designated with the same reference numbers.

The valve assembly 604 includes an inlet section 606, a first worksection 608, a second worksection 610, a third worksection 612, a fourth worksection 614, and an outlet section 616. The worksections 608-614 are positioned adjacent to one another between the inlet section 606 and the outlet section 616. The valve assembly 604 may have a greater or fewer number of valve sections based on an application and a number of actuators controlled by the valve assembly 604.

The inlet section 606 has an inlet port 618 that is configured to be fluidly-coupled to the outlet port 217 of the pump 104 via inlet line 619. The outlet section 616 has a reservoir port 620 that is configured to be fluidly-coupled to the fluid reservoir 106 via reservoir line 621.

Each worksection of the worksections 608-614 includes a housing that defines therein a longitudinal bore configured to receive a spool that is axially movable in the longitudinal bore. The housing includes an open-center passage intercepting the longitudinal bore. The inlet section 606 and the outlet section 616 also have respective open-center passages. The respective open-center passages of the inlet section 606, the worksections 608-614, and the outlet section 616 together form an open-center passage 622 that traverses the valve assembly 604.

The open-center passage 622 receives fluid provided to the inlet port 618 via branch 623 that can be formed in the inlet section 606 as depicted in FIG. 6. As described below, the valve assembly 604 permits continual flow through the open-center passage 622 when all the spools of all worksections are in neutral non-operative positions. Upon shifting one or more spools to actuate the associated hydraulic cylinder actuators, the spools variably restricts or shuts off the open-center flow.

Also, the housing includes a return passage intercepting the longitudinal bore. The respective return passages of the worksections 608-614 together form a return passage 624 that traverses the valve assembly 604. The return passage 624 is fluidly-coupled to the reservoir port 620 via the outlet section 616, and is thus fluidly-coupled to the fluid reservoir 106.

Further, the housing includes a supply passage intercepting the longitudinal bore. The respective supply passages of the worksections 608-614 together form a supply passage 626 that traverses the valve assembly 604. The supply passage 626 is fluidly-coupled to the inlet port 618, and is thus fluidly-coupled to the pump 104.

Each worksection is configured to control fluid flow to and from a respective hydraulic actuator of the hydraulic cylinder actuators 224-230. For example, the first worksection 608 is fluidly-coupled to the first chamber 221 of the hydraulic cylinder actuator 224 via a first workport passage 628, and is fluidly-coupled to the second chamber 223 of the hydraulic cylinder actuator 224 via a second workport passage 630. Each workport passage includes an internal passage inside the housing of the first worksection 608 that is fluidly-coupled to a workport, and includes a fluid line that connects the workport to the respective chamber of the hydraulic cylinder actuator 224.

The worksections 610-614 are similarly configured to control fluid flow to and from the hydraulic cylinder actuators 226-230, respectively. Particularly, as depicted, the worksection 610 has workports passages that control fluid flow to and from the hydraulic cylinder actuator 226, the worksection 612 has workport passages that control fluid flow to and from the hydraulic cylinder actuator 228, and the worksection 614 has workports that control fluid flow to and from the hydraulic cylinder actuator 230.

The spool in each worksection varies in diameter along its length to form lands of variable diameters capable of selectively interconnecting the various passages intercepting the longitudinal bore to control flow of fluid to and from the actuator. When the spool is in a neutral (e.g., unactuated, centered, or unbiased), the open-center passage 622 is open or unobstructed. As such, the open-center passage 622 is the path of least resistance, and fluid received at the inlet port 618 flows through the branch 623, and then through the open-center passage 622.

Fluid then exits the open-center passage 622 and the valve assembly 604 via open-center outlet port 632. The open-center outlet port 632 can be referred to as a "power beyond" port that might be connected to other functions of a machine or vehicle to provide flow thereto. Further, as depicted in FIG. 6, the hydraulic line 110 is fluidly-coupled to the open-center outlet port 632.

Thus, when none of the spools of the worksections 608-614 is actuated, all the output flow of the pump 104 flows through the open-center passage 622, exits the valve assembly 604 via the open-center outlet port 632, and flows through the hydraulic line 110. The valve 116 (either the relief valve 300 or the combination of the spring-loaded check valve 400 and the orifice 402) allows pressure level to increase in the hydraulic line 110 to the maximum value allowed by the valve 116. The pressure sensor 112 thus provides sensor information to the controller 114 indicating such high pressure level, and the controller 114 responsively commands the electric motor 102 to operate at a standby speed (low speed) to reduce the amount of flow and power loss.

Upon shifting the spool to actuate its associated actuator (e.g., when the spool of the first worksection 608 is shifted to actuate the hydraulic cylinder actuator 224), the shifted spool restricts fluid flow through the open-center passage 622. As fluid is restricted from flowing through the open-center passage 622, fluid at the inlet port 618 flows through the supply passage 626.

Further, when the spool is shifted, fluid flowing through the supply passage 626 flows to one of the workport passages of the worksection (e.g., either the first workport passage 628 or the second workport passage 630) based on the direction of the shift of the spool. This way, fluid is provided to the respective hydraulic cylinder actuator to move its piston. Fluid returning from the hydraulic cylinder actuator is also directed by the spool to the return passage 624, and then flows to the fluid reservoir 106 via the reservoir port 620 and the reservoir line 621.

As the shifted spool restricts fluid flow through the open-center passage 622, pressure level in the open-center passage 622 downstream from the spool decreases. Particularly, the spool forms a variable orifice between one or more of its lands with the internal surfaces of the housing of the respective worksection. The size of the variable orifice depends on the extent of movement or the stroke of the spool.

As fluid flows through such variable orifice, pressure level decreases, i.e., a pressure drop occurs from the pressure level of fluid received at the inlet port 618 to pressure level of fluid in the open-center passage 622 downstream from the spool. The larger the amount of fluid flow demanded by the hydraulic cylinder actuator (i.e., the larger the commanded speed for its piston), the larger the shift of the spool. The larger the shift of the spool, the larger the amount of fluid flow diverted to the supply passage 626 to feed the hydraulic cylinder actuator, and the more restrictive the variable orifice becomes. The more restrictive the variable orifice, the larger the pressure drop thereacross, and thus pressure level downstream of the spool in the open-center passage 622 and the hydraulic line 110 coupled thereto decreases further.

As the pressure level in the hydraulic line 110 decreases and the pressure sensor 112 provides sensor information indicative of the pressure level to the controller 114, the controller 114 responsively commands the electric motor 102 to increase its speed to increase the output flow rate of the pump 104 to meet the demand. If the spool is shifted all the way (i.e., maximum stroke) indicating maximum flow demand by the hydraulic cylinder actuator(s), the open-center passage 622 can be blocked, and no fluid flow is provided to the open-center passage 622 or the hydraulic line 110. In this case, pressure level in the hydraulic line 110 can be zero, and the controller 114 commands the electric motor 102 to operate at maximum speed.

Conversely, if flow demand by the hydraulic cylinder actuator decreases and the spool is shifted back toward the neutral position, the variable orifice becomes less restrictive, and the pressure level in the open-center passage 622 and the hydraulic line 110 increases.

Responsively, the controller 114 commands the electric motor 102 to decrease it speed to reduce the output flow rate of the pump 104 and meet the flow demand, without providing excessive flow.

Although the description above involves one spool being shifted, more spools can be actuated at the same time. The operations described above remain the same. In other words, the higher the flow demand by one or more hydraulic cylinder actuators, the smaller the pressure level in the open-center passage 622 and the hydraulic line 110, and the controller 114 increases the speed of the electric motor 102, and vice versa.

With this configuration, the controller 114 modifies, changes, or adjusts the speed of the electric motor 102 such that the speed of the electric motor 102 has an inverse relation with the pressure level in the hydraulic line 110 indicated by the pressure sensor 112. If flow demand by the hydraulic circuit 602 (e.g., by the hydraulic cylinder actuators 224-230) increases, the pressure level of fluid provided to the hydraulic line 110 decreases and can reach zero when the flow demand exceeds the pump capacity at a given motor speed (i.e., when one or more spools are shifted such that maximum flow is provided to the hydraulic cylinder actuators). Responsively, the controller 114 increases the speed of the electric motor 102 to cause the pump 104 to increase flow output to an amount that meets the flow demand.

Conversely, if flow demand by the hydraulic circuit 602 (e.g., by the hydraulic cylinder actuators 224-230) decreases by shifting the spools back toward the neutral position, the pressure level of fluid provided to the hydraulic line 110 increases. Responsively, the controller 114 decreases the speed of the electric motor 102 to cause the pump 104 to decrease flow output to an amount that meets the flow demand, without providing excessive flow. This way, the system 600 operates efficiently as the pump 104 provides sufficient flow to operate the hydraulic circuit 602, as opposed to a particular fixed amount of fluid flow rate output regardless of the flow demand.

In an example, the inverse relation between the speed of the electric motor 102 and the pressure level in the hydraulic line 110 can be an inverse proportional relationship. For instance, if the pressure level in the hydraulic line 110 is 280 psi, the controller 114 operates the electric motor 102 at a standby speed, e.g., 600 RPM. If the pressure level in the hydraulic line 110 decreases to 0 psi (over-demand scenario where all flow from the pump 104 is consumed by the hydraulic cylinder actuators 224-230), the controller 114 operates the electric motor 102 at a maximum speed, e.g., 2000 RPM.

An inverse proportional relationship, indicates that the controller 114 varies the speed linearly. In other examples, the inverse relationship is not linear. Rather, an inverse non-linear relationship or schedule can be tuned as desired.

In describing the system 600, the pump 104 is shown as a fixed displacement pump. However, it should be understood that the variable displacement pump 502 can be used instead. In this case, the controller 114 can control both the speed of the electric motor 102, and can also control the torque output of the electric motor 102 by controlling the angle of the swash plate 504 as described above with respect to FIG. 5.

Controlling the electric motor 102 can involve a closed-loop feedback system for precise control of speed and/or torque of the electric motor 102. The closed-loop feedback system can be implemented in the controller 114 or the inverter 118.

Figure 7:
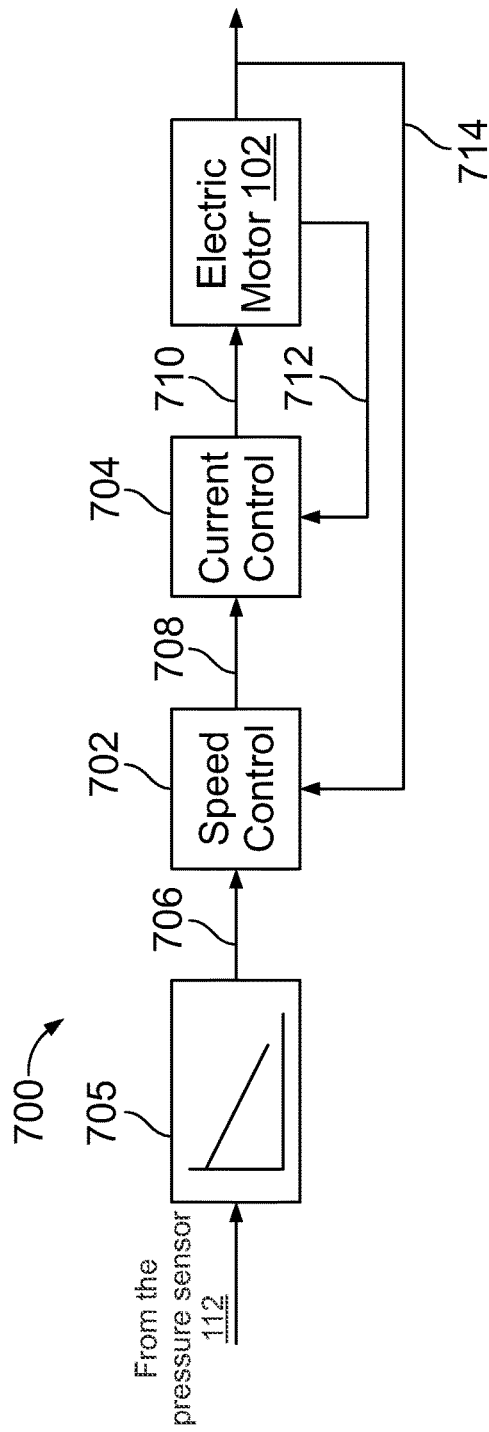
FIG. 7 illustrates a block diagram of a motor control system of an electric motor, in accordance with an example implementation.

FIG. 7 illustrates a block diagram of a motor control system 700 of the electric motor 102, in accordance with an example implementation. In an example, the motor control system 700 is implemented by or comprises the inverter 118. In another example, the motor control system 700 is implemented by the controller 114. In another example, a portion (e.g., speed loop) of the motor control system 700 is implemented by the controller 114 and another portion (e.g., the current loop) is implemented by the inverter 118.

In the example implementation shown in FIG. 7, the motor control system 700 is a closed-loop feedback control system having two control loops or control modules. The first control module is a speed control module 702 and the second control module is a current control module 704.

The motor control system 700 receives the sensor information indicative of the pressure level in the hydraulic line 110 from the pressure sensor 112. The motor control system 700 can have a look-up table 705 or something similar with an inverse relation between the pressure level and the commanded speed of the electric motor 102 as described above. The look-up table 705 converts the signal from the pressure sensor 112 to a speed command for the electric motor 102 (i.e., rotational speed of an output shaft coupled to a rotor of the electric motor 102). The speed command is provided as a speed command signal 706 to the speed control module 702.

The speed control module 702 then determines a reference current command 708 based on an error or difference between the speed command signal 706 and a speed sensor information signal 714 from a sensor coupled to the electric motor 102. For example, the electric motor 102 includes a speed sensor (e.g., a tachometer) that provides the speed sensor information signal 714 to the speed control module 702, which implements closed-loop speed control to control the speed of the electric motor 102.

The speed control module 702 provides the reference current command 708 to the current control module 704. The current control module 704 then provides a current command 710 to drive the electric motor 102. The electric motor 102 includes a current sensor that provides current sensor information signal 712 to the current control module 704, which implements closed-loop current control to control the current provided to the electric motor 102.

As an example for illustration, the speed control module 702 and the current control module 704 can include a proportional-integral (PI) controller. A PI controller is used herein as an example for illustration; however, it should be understood that other types of closed-loop feedback control systems can be used, such as a proportional-integral-derivative (PID) controller.

Figure 8:
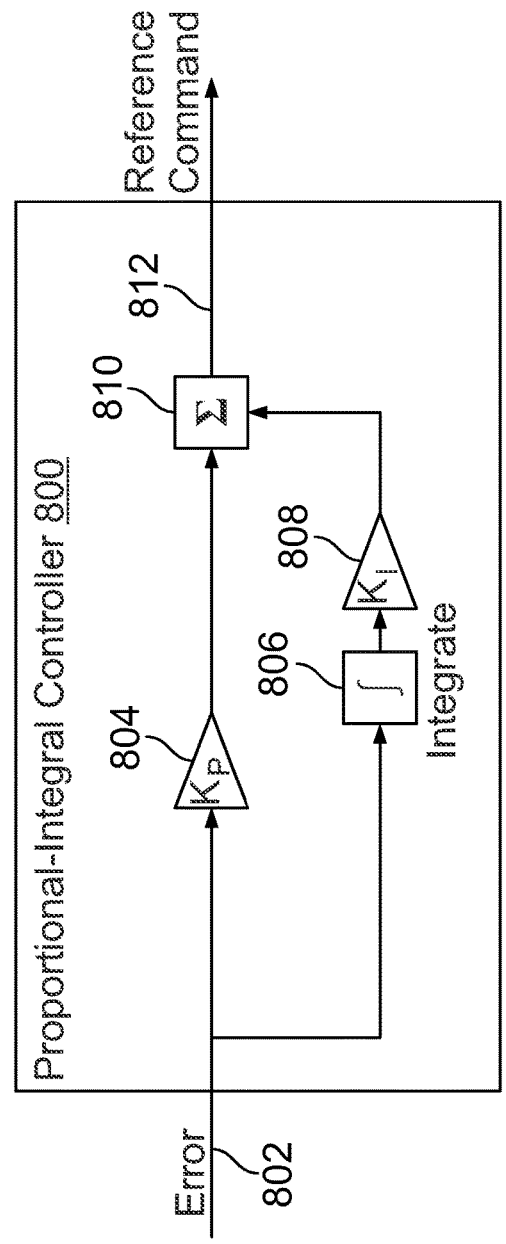
FIG. 8 illustrates a block diagram of a proportional-integral controller, in accordance with an example implementation.

FIG. 8 illustrates a block diagram of a PI controller 800, in accordance with an example implementation. The PI controller 800 represents either a PI speed controller of the speed control module 702 or a PI current controller of the current control module 704.

An error signal 802 representing the difference between a commanded value (e.g., commanded speed or current) and a feedback value (actual speed or actual current provided by a respective sensor) is determined. As such, the error signal 802 represents a difference between the speed command signal 706 and speed sensor information signal 714 or the difference between the reference current command 708 and the current sensor information signal 712.

The error signal 802 is multiplied by a proportional gain $K_P$ at block 804. The error signal 802 is also integrated (e.g., accumulated overtime) at block 806. The result of the integration at the block 806 is then multiplied by an integral gain $K_I$ at block 808. The output of the block 808 is then summed with the output of the block 804 at summation block 810 to generate a reference command 812 (e.g., the reference current command 708 or the current command 710).

Figure 9:
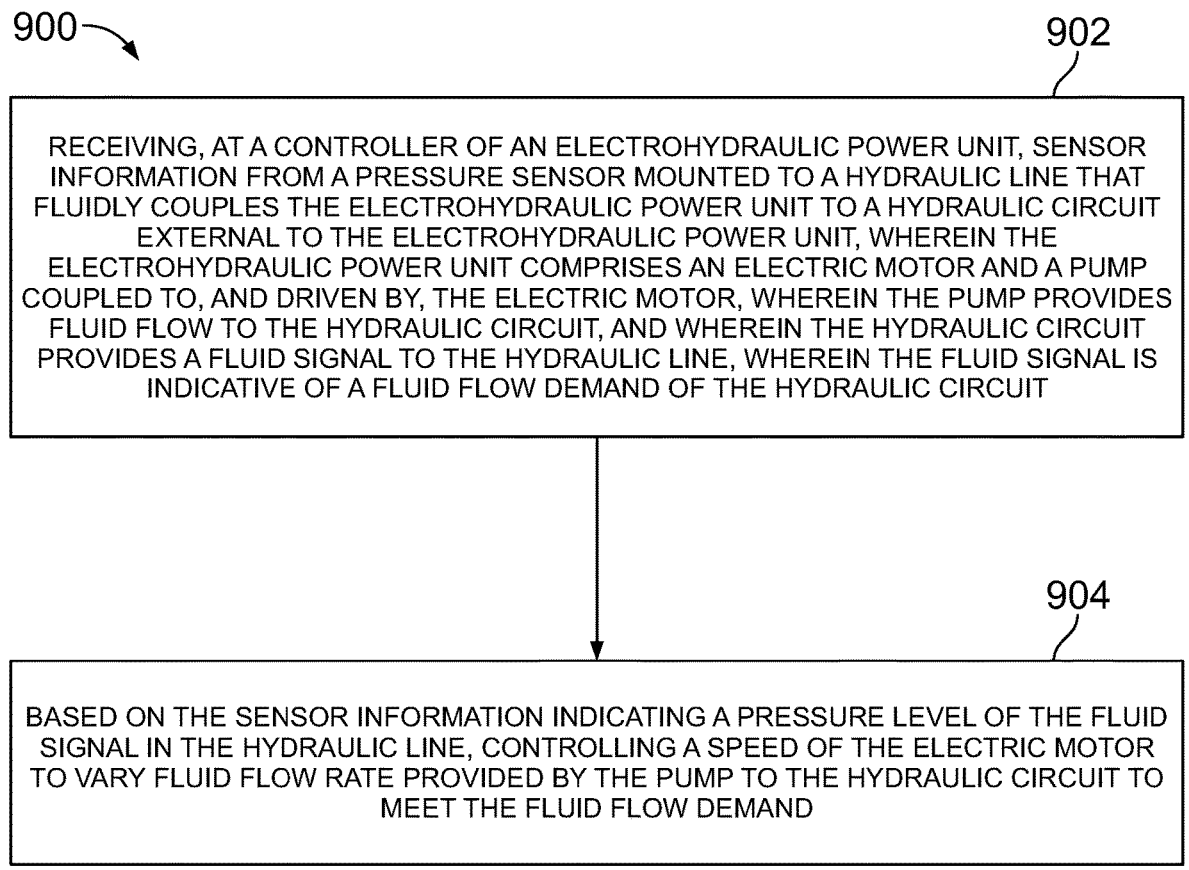
FIG. 9 is a flowchart of a method for operating a system, in accordance with an example implementation.

FIG. 9 is a flowchart of a method 900 for operating a system, in accordance with an example implementation. For example, the method 900 can be implemented with the systems 200, 500, 600 by the controller 114.

The method 900 may include one or more operations, or actions as illustrated by one or more of blocks 902-904. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

In addition, for the method 900 and other processes and operations disclosed herein, the flowchart shows operation of one possible implementation of present examples. In this regard, each block may represent a module, a segment, or a portion of program code, which includes one or more instructions executable by a processor (e.g., a processor or microprocessor of the controller 114) for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 900 and other processes and operations disclosed herein, one or more blocks in FIG. 9 may represent circuitry or digital logic that is arranged to perform the specific logical operations in the process.

At block 902, the method 900 includes receiving, at the controller 114 of an electrohydraulic power unit, sensor information from the pressure sensor 112 mounted to the hydraulic line 110 that fluidly couples the electrohydraulic power unit to the hydraulic circuit (e.g., the hydraulic circuit 108, 202, 602) external to the electrohydraulic power unit, wherein the electrohydraulic power unit comprises the electric motor 102 and a pump (e.g., the pump 104 or the variable displacement pump 502) coupled to, and driven by, the electric motor 102, wherein the pump provides fluid flow to the hydraulic circuit, and wherein the hydraulic circuit provides a fluid signal to the hydraulic line 110, wherein the fluid signal is indicative of a fluid flow demand of the hydraulic circuit.

At block 904, the method 900 includes, based on the sensor information indicating a pressure level of the fluid signal in the hydraulic line 110, controlling a speed of the electric motor 102 to vary fluid flow rate provided by the pump to the hydraulic circuit to meet the fluid flow demand.

The method 900 can further include any of the operations throughout the disclosure. For example, controlling the speed of the electric motor can include: controlling the speed of the electric motor via an inverse relationship between the pressure level of the fluid signal and the speed of the electric motor 102, such that the speed of the electric motor 102 is increased to increase the fluid flow rate discharged by the pump as the pressure level of the fluid signal decreases.

In examples, the electrohydraulic power unit further includes: the fluid reservoir 106 containing fluid at a low pressure level, wherein the pump is configured to draw fluid from the fluid reservoir 106 and discharge the fluid flow to the hydraulic circuit. The electrohydraulic power unit can also include the valve 116 that fluidly couples the hydraulic line 110 to the fluid reservoir 106, wherein the valve 116 is configured to allow the pressure level in the hydraulic line 110 to increase to a threshold pressure value before opening and relieving fluid to the fluid reservoir 106.

In a first example, the valve 116 comprises the relief valve 300. In another example, the spring-loaded check valve 400 and the orifice 402 disposed in parallel with the spring-loaded check valve 400.

The hydraulic circuit can take different forms as described above with respect to FIGS. 2 and 6, as examples.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to those with skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a system comprising: an electric motor: a pump coupled to, and driven by, the electric motor: a hydraulic circuit fluidly-coupled to the pump and configured to receive fluid flow from the pump: a hydraulic line fluidly-coupled to the hydraulic circuit, wherein the hydraulic circuit is configured to provide a fluid signal to the hydraulic line, wherein the fluid signal is indicative of a fluid flow demand of the hydraulic circuit: a pressure sensor mounted to the hydraulic line and configured to provide sensor information indicative of pressure level of fluid in the hydraulic line; and a controller configured to perform operations comprising:

receiving the sensor information from the pressure sensor, and based on the pressure level indicated by the sensor information, controlling a speed of the electric motor to vary fluid flow rate provided by the pump to the hydraulic circuit to meet the fluid flow demand.

EEE 2 is the system of EEE 1, wherein controlling the speed of the electric motor comprises: increasing the speed of the electric motor to increase the fluid flow rate provided by the pump as the pressure level in the hydraulic line decreases.

EEE 3 is the system of any of EEEs 1-2, further comprising: a fluid reservoir containing fluid at a low pressure level, wherein the pump is configured to draw fluid from the fluid reservoir and discharge the fluid flow to the hydraulic circuit; and a valve fluidly-coupling the hydraulic line to the fluid reservoir, wherein the valve is configured to allow the pressure level in the hydraulic line to increase to a threshold pressure value before opening and relieving fluid to the fluid reservoir.

EEE 4 is the system of EEE 3, wherein the valve comprises a relief valve.

EEE 5 is the system of EEE 3, wherein the valve comprises: a spring-loaded check valve; and an orifice disposed in parallel with the spring-loaded check valve.

EEE 6 is the system of any of EEEs 1-5, wherein the hydraulic circuit comprises: a valve assembly comprising a plurality of worksections, each worksection configured to control fluid flow to and from a respective hydraulic actuator, wherein the valve assembly comprises a load-sense passage traversing the plurality of worksections and configured to communicate a load-sense fluid pressure signal that represents highest load-induced pressure among respective hydraulic actuators controlled by the plurality of worksections; and an unloading valve comprising: (i) an inlet port configured to receive fluid from the pump, (ii) a pilot port configured to receive the load-sense fluid pressure signal, and (iii) an outlet port fluidly-coupled to the hydraulic line to provide the fluid signal thereto.

EEE 7 is the system of EEE 6, wherein the unloading valve further comprises: a movable element, wherein the load-sense fluid pressure signal applies a first fluid force on the movable element, and wherein fluid from the inlet port applies a second fluid force on the movable element opposite the first fluid force: and a spring applying a biasing force on the movable element, wherein: when the second fluid force overcomes the first fluid force and the biasing force, the unloading valve opens to provide the fluid signal to the hydraulic line that is fluidly coupled to the outlet port, such that the pressure level of the fluid signal is based on a difference between the second fluid force and a combination of the first fluid force and the biasing force, and when a combined force of the second fluid force and the biasing force exceeds the first fluid force, the unloading valve blocks fluid flow to the hydraulic line, such that the pressure level of the fluid signal is substantially zero.

EEE 8 is the system of any of EEEs 1-5, wherein the hydraulic circuit comprises: a valve assembly comprising a plurality of worksections, each worksection configured to control fluid flow to and from a respective hydraulic actuator, wherein the valve assembly comprises: (i) a supply passage fluidly-coupled to the pump, and (ii) an open-center passage configured to receive fluid from the pump and is fluidly-coupled to the hydraulic line, wherein: when the plurality of worksections are unactuated, fluid flow from the pump is provided to the open-center passage, and then to the hydraulic line, and when one or more of the plurality of worksections are actuated, fluid flow to the open-center passage and the hydraulic line is restricted, such that fluid flow is provided to the supply passage, thereby reducing the pressure level of the fluid signal in the hydraulic line; and a valve disposed downstream from the plurality of worksections and configured to fluidly-couple the hydraulic line to the fluid reservoir, wherein the valve is configured to allow the pressure level in the hydraulic line to increase to a threshold pressure value before opening and relieving fluid to the fluid reservoir.

EEE 9 is an electrohydraulic power unit comprising: an electric motor: a pump coupled to, and driven by, the electric motor, wherein the pump is configured to provide fluid flow to a hydraulic circuit external to the electrohydraulic power unit: a pressure sensor configured to measure a pressure level of a fluid signal received from the hydraulic circuit, wherein the fluid signal is indicative of a fluid flow demand of the hydraulic circuit: and a controller configured to perform operations comprising: receiving sensor information from the pressure sensor indicating the pressure level of the fluid signal, and based on the pressure level indicated by the sensor information, controlling a speed of the electric motor to vary fluid flow rate discharged from the pump to meet the fluid flow demand of the hydraulic circuit.

EEE 10 is the electrohydraulic power unit of EEE 9, wherein controlling the speed of the electric motor comprises: controlling the speed of the electric motor via an inverse relationship between the pressure level of the fluid signal and the speed of the electric motor, such that the speed of the electric motor is increased to increase the fluid flow rate discharged by the pump as the pressure level of the fluid signal decreases.

EEE 11 is the electrohydraulic power unit of any of EEEs 9-10, further comprising: a fluid reservoir containing fluid at a low pressure level, wherein the pump is configured to draw fluid from the fluid reservoir and discharge the fluid flow to the hydraulic circuit; and a valve fluidly-coupling the fluid signal to the fluid reservoir, wherein the valve is configured to allow the pressure level of the fluid signal to increase to a threshold pressure value before opening and relieving fluid to the fluid reservoir.

EEE 12 the electrohydraulic power unit of EEE 11, wherein the valve comprises a relief valve.

EEE 13 is the electrohydraulic power unit of EEE 11, wherein the valve comprises: a spring-loaded check valve: and an orifice disposed in parallel with the spring-loaded check valve.

EEE 14 is a method comprising: receiving, at a controller of an electrohydraulic power unit, sensor information from a pressure sensor mounted to a hydraulic line that fluidly couples the electrohydraulic power unit to a hydraulic circuit external to the electrohydraulic power unit, wherein the electrohydraulic power unit comprises an electric motor and a pump coupled to, and driven by, the electric motor, wherein the pump provides fluid flow to the hydraulic circuit, and wherein the hydraulic circuit provides a fluid signal to the hydraulic line, wherein the fluid signal is indicative of a fluid flow demand of the hydraulic circuit; and based on the sensor information indicating a pressure level of the fluid signal in the hydraulic line, controlling a speed of the electric motor to vary fluid flow rate provided by the pump to the hydraulic circuit to meet the fluid flow demand.

EEE 15 is the method of EEE 14, wherein controlling the speed of the electric motor comprises: controlling the speed of the electric motor via an inverse relationship between the pressure level of the fluid signal and the speed of the electric motor, such that the speed of the electric motor is increased to increase the fluid flow rate discharged by the pump as the pressure level of the fluid signal decreases.

EEE 16 is the method of any of EEEs 14-15, wherein the electrohydraulic power unit further comprises: a fluid reservoir containing fluid at a low pressure level, wherein the pump is configured to draw fluid from the fluid reservoir and discharge the fluid flow to the hydraulic circuit; and a valve fluidly-coupling the hydraulic line to the fluid reservoir, wherein the valve is configured to allow the pressure level in the hydraulic line to increase to a threshold pressure value before opening and relieving fluid to the fluid reservoir.

EEE 17 is the method of EEE 16, wherein the valve comprises a relief valve or a combination of spring-loaded check valve and an orifice disposed in parallel with the spring-loaded check valve.

EEE 18 is the method of EEE 16, wherein the pump is a variable displacement pump having a swash plate, and wherein the method further comprises changing an angle of the swash plate of the pump.

EEE 19 is the method of any of EEEs 14-18, wherein the hydraulic circuit comprises: a valve assembly comprising a plurality of worksections, each worksection configured to control fluid flow to and from a respective hydraulic actuator, wherein the valve assembly comprises a load-sense passage traversing the plurality of worksections and configured to communicate a load-sense fluid pressure signal that represents highest load-induced pressure among respective hydraulic actuators controlled by the plurality of worksections; and an unloading valve comprising: (i) an inlet port configured to receive fluid from the pump, (ii) a pilot port configured to receive the load-sense fluid pressure signal, (iii) an outlet port fluidly-coupled to the hydraulic line to provide the fluid signal thereto, (iv) a movable element, wherein the load-sense fluid pressure signal applies a first fluid force on the movable element, and wherein fluid from the inlet port applies a second fluid force on the movable element opposite the first fluid force, and (v) a spring applying a biasing force on the movable element, wherein: when the second fluid force overcomes the first fluid force and the biasing force, the unloading valve opens to provide the fluid signal to the hydraulic line that is fluidly coupled to the outlet port, such that the pressure level of the fluid signal is based on a difference between the second fluid force and a combination of the first fluid force and the biasing force, and when a combined force of the second fluid force and the biasing force exceeds the first fluid force, the unloading valve blocks fluid flow to the hydraulic line, such that the pressure level of the fluid signal is substantially zero.

EEE 20 is the method of any of EEEs 14-18, wherein the hydraulic circuit comprises: a valve assembly comprising a plurality of worksections, each worksection configured to control fluid flow to and from a respective hydraulic actuator, wherein the valve assembly comprises: (i) a supply passage fluidly-coupled to the pump, and (ii) an open-center passage configured to receive fluid from the pump and is fluidly-coupled to the hydraulic line, wherein: when the plurality of worksections are unactuated, fluid flow from the pump is provided to the open-center passage, and then to the hydraulic line, and when one or more of the plurality of worksections are actuated, fluid flow to the open-center passage and the hydraulic line is restricted, such that fluid flow is provided to the supply passage, thereby reducing the pressure level of the fluid signal in the hydraulic line.

What is claimed is:

1. A system comprising:
    an electric motor;
    a pump coupled to, and driven by, the electric motor;
    a hydraulic circuit fluidly-coupled to the pump and configured to receive fluid flow from the pump, wherein the hydraulic circuit comprises: (i) a valve assembly comprising a plurality of worksections, each worksection configured to control fluid flow to and from a respective hydraulic actuator, wherein the valve assembly comprises a load-sense passage traversing the plurality of worksections and configured to communicate a load-sense fluid pressure signal that represents highest load-induced pressure among respective hydraulic actuators controlled by the plurality of worksections, and (ii) an unloading valve comprising: (a) an inlet port configured to receive fluid from the pump, (b) a pilot port configured to receive the load-sense fluid pressure signal, and (c) an outlet port;
    a hydraulic line fluidly-coupled to the outlet port of the valve assembly of the hydraulic circuit, wherein the outlet port is configured to provide a fluid signal to the hydraulic line, wherein the fluid signal is indicative of a fluid flow demand of the hydraulic circuit;
    a pressure sensor mounted to the hydraulic line and configured to provide sensor information indicative of pressure level of fluid in the hydraulic line; and
    a controller configured to perform operations comprising:
        receiving the sensor information from the pressure sensor, and
        based on the pressure level indicated by the sensor information, controlling a speed of the electric motor to vary fluid flow rate provided by the pump to the hydraulic circuit to meet the fluid flow demand.

2. The system of claim 1, wherein controlling the speed of the electric motor comprises:
    increasing the speed of the electric motor to increase the fluid flow rate provided by the pump as the pressure level in the hydraulic line decreases.

3. The system of claim 1, further comprising:
    a fluid reservoir containing fluid at a low pressure level, wherein the pump is configured to draw fluid from the fluid reservoir and discharge the fluid flow to the hydraulic circuit; and
    a valve fluidly-coupling the hydraulic line to the fluid reservoir, wherein the valve is configured to allow the pressure level in the hydraulic line to increase to a threshold pressure value before opening and relieving fluid to the fluid reservoir.

4. The system of claim 3, wherein the valve comprises a relief valve.

5. The system of claim 3, wherein the valve comprises:
    a spring-loaded check valve; and
    an orifice disposed in parallel with the spring-loaded check valve.

6. The system of claim 1, wherein the unloading valve further comprises:
    a movable element, wherein the load-sense fluid pressure signal applies a first fluid force on the movable element, and wherein fluid from the inlet port applies a second fluid force on the movable element opposite the first fluid force; and
    a spring applying a biasing force on the movable element, wherein:
        when the second fluid force overcomes the first fluid force and the biasing force, the unloading valve opens to provide the fluid signal to the hydraulic line that is fluidly coupled to the outlet port, such that the pressure level of the fluid signal is based on a difference between the second fluid force and a combination of the first fluid force and the biasing force, and when a combined force of the second fluid force and the biasing force exceeds the first fluid force, the unloading valve blocks fluid flow to the hydraulic line, such that the pressure level of the fluid signal is substantially zero.

7. A system comprising:
an electric motor;
a pump coupled to, and driven by, the electric motor;
a hydraulic circuit fluidly-coupled to the pump and configured to receive fluid flow from the pump;
a hydraulic line fluidly-coupled to the hydraulic circuit, wherein the hydraulic circuit is configured to provide a fluid signal to the hydraulic line, wherein the fluid signal is indicative of a fluid flow demand of the hydraulic circuit;
a pressure sensor mounted to the hydraulic line and configured to provide sensor information indicative of pressure level of fluid in the hydraulic line, wherein the hydraulic circuit comprises: (i) a valve assembly comprising a plurality of worksections, each worksection configured to control fluid flow to and from a respective hydraulic actuator, wherein the valve assembly comprises: (a) a supply passage fluidly-coupled to the pump, and (b) an open-center passage configured to receive fluid from the pump and is fluidly-coupled to the hydraulic line, wherein: when the plurality of worksections are unactuated, fluid flow from the pump is provided to the open-center passage, and then to the hydraulic line, and when one or more of the plurality of worksections are actuated, fluid flow to the open-center passage and the hydraulic line is restricted, such that fluid flow is provided to the supply passage, thereby reducing the pressure level of the fluid signal in the hydraulic line, and (ii) a valve disposed downstream from the plurality of worksections and configured to fluidly-couple the hydraulic line to a fluid reservoir, wherein the valve is configured to allow the pressure level in the hydraulic line to increase to a threshold pressure value before opening and relieving fluid to the fluid reservoir; and
a controller configured to perform operations comprising:
receiving the sensor information from the pressure sensor, and
based on the pressure level indicated by the sensor information, controlling a speed of the electric motor to vary fluid flow rate provided by the pump to the hydraulic circuit to meet the fluid flow demand.

8. An electrohydraulic power unit comprising:
an electric motor;
a pump coupled to, and driven by, the electric motor, wherein the pump is configured to provide fluid flow to a hydraulic circuit external to the electrohydraulic power unit;
a pressure sensor configured to measure a pressure level of a fluid signal received from the hydraulic circuit, wherein the fluid signal is indicative of a fluid flow demand of the hydraulic circuit; and
a controller configured to perform operations comprising:
receiving sensor information from the pressure sensor indicating the pressure level of the fluid signal, and
based on the pressure level indicated by the sensor information, controlling a speed of the electric motor via an inverse relationship between the pressure level of the fluid signal and the speed of the electric motor, such that the speed of the electric motor is increased to increase fluid flow rate discharged by the pump as the pressure level of the fluid signal decreases to meet the fluid flow demand of the hydraulic circuit.

9. The electrohydraulic power unit of claim 8, further comprising:
a fluid reservoir containing fluid at a low pressure level, wherein the pump is configured to draw fluid from the fluid reservoir and discharge the fluid flow to the hydraulic circuit; and
a valve fluidly-coupling the fluid signal to the fluid reservoir, wherein the valve is configured to allow the pressure level of the fluid signal to increase to a threshold pressure value before opening and relieving fluid to the fluid reservoir.

10. The electrohydraulic power unit of claim 9, wherein the valve comprises a relief valve.

11. The electrohydraulic power unit of claim 9, wherein the valve comprises:
a spring-loaded check valve; and
an orifice disposed in parallel with the spring-loaded check valve.

12. A method comprising:
receiving, at a controller of an electrohydraulic power unit, sensor information from a pressure sensor mounted to a hydraulic line that fluidly couples the electrohydraulic power unit to a hydraulic circuit external to the electrohydraulic power unit, wherein the electrohydraulic power unit comprises (i) an electric motor and a pump coupled to, and driven by, the electric motor, wherein the pump is a variable displacement pump having a swash plate, wherein the pump provides fluid flow to the hydraulic circuit, and wherein the hydraulic circuit provides a fluid signal to the hydraulic line, wherein the fluid signal is indicative of a fluid flow demand of the hydraulic circuit, (ii) a fluid reservoir containing fluid at a low pressure level, wherein the pump is configured to draw fluid from the fluid reservoir and discharge the fluid flow to the hydraulic circuit, and (iii) a valve fluidly-coupling the hydraulic line to the fluid reservoir;
using the valve to allow the pressure level in the hydraulic line to increase to a threshold pressure value before opening and relieving fluid to the fluid reservoir;
based on the sensor information indicating a pressure level of the fluid signal in the hydraulic line, controlling a speed of the electric motor to vary fluid flow rate provided by the pump to the hydraulic circuit to meet the fluid flow demand; and
changing an angle of the swash plate of the pump.

13. The method of claim 12, wherein controlling the speed of the electric motor comprises:
controlling the speed of the electric motor via an inverse relationship between the pressure level of the fluid signal and the speed of the electric motor, such that the speed of the electric motor is increased to increase the fluid flow rate discharged by the pump as the pressure level of the fluid signal decreases.

14. The method of claim 12, wherein the valve comprises a relief valve or a combination of spring-loaded check valve and an orifice disposed in parallel with the spring-loaded check valve.

15. The method of claim 12, wherein the hydraulic circuit comprises:
a valve assembly comprising a plurality of worksections, each worksection configured to control fluid flow to and from a respective hydraulic actuator, wherein the valve assembly comprises a load-sense passage traversing the plurality of worksections and configured to communicate a load-sense fluid pressure signal that represents highest load-induced pressure among respective hydraulic actuators controlled by the plurality of worksections; and an unloading valve comprising: (i) an inlet port configured to receive fluid from the pump, (ii) a pilot port configured to receive the load-sense fluid pressure signal, (iii) an outlet port fluidly-coupled to the hydraulic line to provide the fluid signal thereto, (iv) a movable element, wherein the load-sense fluid pressure signal applies a first fluid force on the movable element, and wherein fluid from the inlet port applies a second fluid force on the movable element opposite the first fluid force, and (v) a spring applying a biasing force on the movable element, wherein:

when the second fluid force overcomes the first fluid force and the biasing force, the unloading valve opens to provide the fluid signal to the hydraulic line that is fluidly coupled to the outlet port, such that the pressure level of the fluid signal is based on a difference between the second fluid force and a combination of the first fluid force and the biasing force, and when a combined force of the second fluid force and the biasing force exceeds the first fluid force, the unloading valve blocks fluid flow to the hydraulic line, such that the pressure level of the fluid signal is substantially zero.

16. The method of claim 12, wherein the hydraulic circuit comprises:

a valve assembly comprising a plurality of worksections, each worksection configured to control fluid flow to and from a respective hydraulic actuator, wherein the valve assembly comprises: (i) a supply passage fluidly-coupled to the pump, and (ii) an open-center passage configured to receive fluid from the pump and is fluidly-coupled to the hydraulic line, wherein:

when the plurality of worksections are unactuated, fluid flow from the pump is provided to the open-center passage, and then to the hydraulic line, and when one or more of the plurality of worksections are actuated, fluid flow to the open-center passage and the hydraulic line is restricted, such that fluid flow is provided to the supply passage, thereby reducing the pressure level of the fluid signal in the hydraulic line.

* * * * *